United States Patent [19]

Mumcu et al.

[11] Patent Number: 4,689,364

[45] Date of Patent: Aug. 25, 1987

[54] PROCESS FOR PREPARING POLYAMIDE BASED, TITANIUM DIOXIDE PIGMENTED PULVERULENT COATING COMPOSITIONS HAVING AT LEAST TEN ALIPHATICALLY BOUND CARBON ATOMS PER CARBONAMIDE GROUP

[75] Inventors: Salih Mumcu, Marl; Hans P. Aurich, Haltern; Helmut Winzer, Finnentrop, all of Fed. Rep. of Germany

[73] Assignee: Huls Aktiengesellschaft, Marl, Fed. Rep. of Germany

[21] Appl. No.: 840,640

[22] Filed: Mar. 18, 1986

[30] Foreign Application Priority Data

Mar. 23, 1985 [DE] Fed. Rep. of Germany ....... 3510687

[51] Int. Cl.$^4$ .............................................. C08G 69/46
[52] U.S. Cl. .................................... 524/497; 523/303; 524/606; 524/847; 524/879; 528/496
[58] Field of Search .............. 524/497, 606, 847, 879; 523/303; 528/496

[56] References Cited

U.S. PATENT DOCUMENTS 4,334,056  6/1982  Meyer et al. ........................ 525/432

*Primary Examiner*—Harold D. Anderson
*Attorney, Agent, or Firm*—Quaintance, Murphy & Presta

[57] ABSTRACT

An improved process for preparing pulverulent coating compositions pigmented with titanium dioxide and based on polyamides having at least ten aliphatically bound carbon atoms per carbonamide group using the precipitation method. The titanium dioxide pigments used are without nucleating effects or only have weak nucleating effects on the polyamide precipitation. The pigments have nucleating effects less than or equal to 3° C. where $\Delta T = (T_{max\ p}) - (T_o)$. $T_{max\ p}$ is the maximum temperature at which precipitation takes place in a solution of polyamide having pigment therein and $T_o$ is the maximum temperature at which precipitation takes place in polyamide solution having no pigment therein.

9 Claims, No Drawings

PROCESS FOR PREPARING POLYAMIDE BASED, TITANIUM DIOXIDE PIGMENTED PULVERULENT COATING COMPOSITIONS HAVING AT LEAST TEN ALIPHATICALLY BOUND CARBON ATOMS PER CARBONAMIDE GROUP

CROSS-REFERENCE TO RELATED APPLICATIONS

Applicants claim priority under 35 USC 119 for application No. P 35 10 687.5, filed Mar. 23, 1985, in the Patent Office of the Federal Republic of Germany.

The disclosure of copending application Ser. No. 840,819 filed Mar. 18, 1986 of MUMCU ET AL entitled "Process for Preparing Pulverulent Coating Compositions Based Upon Polyamides Having at Least 10 Aliphatically Bound Carbon Atoms per Carbonamide Group" is incorporated herein to show an improved precipitation procedure useful in the present invention.

BACKGROUND OF THE INVENTION

The field of the present invention is polyamide powders for the coating of metals.

The invention is particularly concerned with methods for the production of pulverulent coating compositions pigmented with titanium dioxide based on polyamides having at least ten aliphatically bound carbon atoms per carbonamide group by the precipitation method. Copolyamides or a mixture of homo- and copolyamides containing at least 70% of the stated components are also useful.

The state of the prior art of producing polyamide powders may be ascertained by reference to U.S. Pat. Nos. 3,476,711; 3,900,607; 3,927,141; 3,966,838; 4,143,025; 4,195,162; 4,273,919; and 4,334,056; British Pat. Nos. 535,138; 688,771; and 1,392,949; and the Kirk-Othmer "Encyclopedia of Chemical Technology", 2nd Ed., Vol. 16 (1968), under the section "Polyamide (plastics", pages 88-105, particularly page 92 - polylauryllactam (nylon-12), and polyundecanamide (nylon-11), page 101 Solution Processes, and Powder Processing, pages 101-102, the disclosures of which are incorporated herein by reference.

The flame spraying and fluidized bed coating of nylon on a metal base is disclosed in U.S. Pat. No. 3,203,822.

The apparatus for determining the nucleating effect of the titanium dioxide pigment used in the present invention is known from Chem. Ing. Technik 51, (1979), No. 8, page 823, the disclosure of which is incorporated herein by reference.

The use of pulverulent coating compositions based on polyamides to prepare varnish-type metal coatings is known. The coating is implemented by the melt film method, that is, by the fluidized bed method, the flame spray procedure, or by the electrostatic coating process. The polyamide powders are manufactured by precipitating the polyamide from solutions as disclosed in British Pat. No. 688,771, or by grinding the polyamide granulate, preferably at low temperatures and in an inert gas atmosphere as disclosed in U.S. Pat. No. 4,273,919.

The precipitation method of British Pat. No. 688,771 describes the precipitation of polyamide powders from ethanol by cooling the hot polyamide solution externally or by letting it stand. It is only by cooling or letting the hot polyamide solution stand that powders with a high proportion of fine grains is obtained and these fine particles result in dust generation and thick smoking in the fluidized bed. Lastly, such a procedure causes undesired agglomerations which subsequently must be abraded or ground into the required powder size. Moreover, such precipitation methods do not offer reproducible batches, that is, they result in differing production batches which vary in particle size, molecular weight and bulk density.

It is furthermore known to manufacture polyamide powders by grinding polyamides of low molecular weights and by bringing the powders so obtained thereupon to the desired viscosity by heating them to temperatures below the melting point as disclosed in British Pat. No. 535,138, and U.S. Pat. No. 3,476,711.

Polylauryllactam powders also are prepared by this method and are also used in a known procedure for coating as disclosed in Chem. Ind., November 1968, pp 783-791, and Modern Plastics, February 1966, pp. 153-156. Because the polylauryllactam powders do not always meet the requirements of high elasticity, resistance to alkaline aqueous solutions and frequently tend to emit thick smokes, especially during processing, the most diverse improvements have been used. Illustrations of these diverse uses are plasticizer-containing polylauryllactam powders as disclosed in U.S. Pat. No. 3,900,607, those made from a mixture of homopolylauryllactam and lauryllactam containing copolyamides as disclosed in British Pat. No. 1,392,949, those containing polyamides with N-alkoxymethyl groups aside from acidically reacting catalysts as disclosed in U.S. Pat. No. 3,966,838, or mixtures of polyamides having 8 to 11 aliphatically bound carbon atoms per carbonamide group, aminoplasts bearing alkoxyalkyl groups and acidically reacting catalysts as disclosed in U.S. Pat. No 3,927,141. In specific instances these powders offer good properties; however, they fail to fully meet all requirements.

An improved method is described in U.S. Pat. Nos. 4,143,025 and 4,195,162. This method is still unsatisfactory in that a grinding procedure is employed to produce pigment free powders and, in order to manufacture pigmented powders, the precipitation method must be used. Lastly, this method is based on the assumed use of polylauryllactam granulate starting materials prepared exclusively by hydrolytic polymerization in the presence of specific amounts of phosphoric acid.

U.S. Pat. No. 4,334,056 discloses a substantially improved procedure comprising a method of producing polyamide powder from polyamide having a relative viscosity of 1.4 to 1.8 as measured in 0.5% meta-cresol solution at 25° C. and at least 70% of said polyamide consisting of polyamide with at least ten aliphatically bound carbon atoms per carbonamide group, comprising:

(a) dissolving said polyamide in at least twice the amount by weight of ethanol in a closed vessel at a temperature between about 130° to 150° C. to form a solution of said polyamide;

(b) cooling said solution to a precipitation temperature between about 100° and 125° C. and ceasing said cooling at said precipitation temperature;

(c) precipitating said polyamide powder from said cooled solution of (b) polytropically with agitation and under an inert gas atmosphere; and (d) separating said precipitated polyamide powders of (c) from said ethanol.

Still, this procedure needs, on the one hand, improvement especially with regard to shortening the precipitation. Such an improvement is proposed in copending U.S. patent application Ser. No. 840,819 of MUMCU ET AL. On the other hand, pigmented pulverulent coating compositions still suffer from drawbacks deserving improvement.

Pigment containing powders, especially those containing titanium dioxide, frequently evince low bulk densities of 300 to 400 grams/liter. However, the bulk density of coating powders, especially those to be used in the fluidized bed process, should be above 400 grams/liter, in particular in the range from 500 to 700 grams/liter.

Such fluidized bed powders as a rule evince a grain size between 40 and 250 microns. It is known that powders having a low bulk density entail the drawback of excess powder running very poorly off the coated object, or not at all, whereby the coating is irregular. This shortcoming cannot be remedied by adding antistatic compositions, quite aside from the fact that this would introduce other drawbacks. As a rule this low bulk density is caused by the coating powders having a porous structure.

Lastly, the known precipitation methods result in a grain size distribution which changes during the drying process. This is especially the case where there is a shift toward grain sizes that are too small, in which case the proportion of the finest grains, i.e., those less than ten microns, becomes enlarged. This proportion of dust makes subsequent sifting mandatory and inherently an additional complex processing step is required.

SUMMARY OF THE INVENTION

Having in mind the limitations of the prior art it is an object of the present invention to provide a process resulting in coating compositions evincing known good properties such as elasticity and excellent resistance to aqueous alkaline solutions and which, furthermore, are free from the stated drawbacks such as low bulk density or porosity and a high proportion of fine grains.

The objects of the present invention are achieved by a process for preparing coating powders pigmented with titanium dioxide and based on polyamides having at least ten aliphatically bound carbon atoms per carbonamide group or copolyamides or a mixture of homopolyamides and copolyamides containing at least 70% by weight of the stated components, wherein titanium dioxide pigments are used without a nucleating effect, or with a weak nucleating effect, of $\Delta T \leq 3°$ C., where $\Delta T = (T_{max\,p}) - (T_o)$.

$T_{max\,p}$ is the maximum temperature of precipitation of particles from a solution of polyamide and pigment, and $T_o$ is the maximum temperature of precipitation of the pigment free polyamide solution.

DESCRIPTION OF THE PREFERRED EMBODIMENTS

The nucleating effect of titanium dioxide is determined by the following procedure:

A 5-liter autoclave converted into a calorimeter and provided with a paddle stirrer is used. The paddle stirrer has a diameter half that of the autoclave. A suitable apparatus is described in Chem. Ing. Technik 51 (1979), No. 8, p 823. The autoclave is filled with a mixture of 2,400 grams of ethanol (denatured by methylethylketone, 1% by weight water content), 400 grams of polyamide granulate and 32 grams of titanium dioxide pigment. The polyamide is stirred at 150 rpm and dissolved within one hour at 145° C. Thereupon the circulation of the heating medium in the jacket is stopped and the inside temperature is lowered at a rate of 60° C./hour down to 110° C. by distilling the ethanol into an external receiver. Next the distillation is stopped and the inside temperature no longer is regulated. Precipitation takes place within thirty minutes. The maximum inside temperature taking place ($T_{max\,p}$) is maintained.

In a similar manner, the maximum inside temperature that occurs is maintained in the absence of the titanium dioxide pigment ($T_o$), but in the presence of the same pigment-free polyamide. The difference $\Delta T = T_{max\,p} - T_o$ is a measure of the nucleating effect of the pigment. The larger the nucleating effect of the pigment, the larger also the temperature difference. Suitable pigments are those having a weak nucleating effect, i.e., those with $\Delta T$ less than or equal to 3° C.

Accordingly, applicable polyamides for the process of the invention are polyundecanoic acid amide, polylauryllactam (11 aliphatically bound carbon atoms per carbonamide group) and polyamides having more than 11 aliphatically bound carbon atoms per carbonamide group, preferably polylauryllactam. Furthermore, the corresponding copolyamides can be used, or mixtures of homo- and copolyamides which contain at least 70% by weight of the stated components. Accordingly, they may contain as comonomers between 0 and 30% by weight of one or more comonomers such as caprolactam, hexamethylenediamine, 2-methylpentanediamine-(1,5), octamethylenediamine-(1,8), dodecamethylenediamine, isophoronediamine, trimethylhexamethylenediamine, adipic acid, suberic acid, azelaic acid, dodecanoic diacid, and aminoundecanoic acid. The homopolyamides or copolyamides designated below as polyamides are used in the form of granulates or scrap having a relative solution viscosity between 1.4 and 1.8 (measured in 0.5% m-cresol solution at 25° C.).

The polyamides are prepared by polycondensation, hydrolytic or acidolytic polymerization or also by activated anionic polymerization. They may be produced with controlled or uncontrolled molecular weights, that is, in the absence of any chain stabilizers such as acetic acid, benzoic acid, adipic acid, azelaic acid, sebacic acid, and dodecanoic diacid.

Advantageously the polyamides contain up to 1% by weight of phosphoric acid.

In the precipitation procedure proper, the titanium dioxide pigment is added before or during the precipitation. Advantageously it is added to the ethanol polyamide mixture as an ethanol suspension. Accordingly, polyamide granulates also can be introduced into the precipitation procedure which already contain the titanium dioxide pigment, that is, those which received the pigment in the extruder before or during the production of the polyamide.

The process described in application Ser. No. 840,819 of MUMCU et al, supra, can be applied in especially advantageous manner in the improved precipitation procedure.

The process of application Ser. No. 840,819 is described again.

A solution of the polyamide in ethanol and prepared at 140° to 150° C. is cooled at least at the rate of 10° C./hour while rapidly distilling ethanol to the saturation limit (about 125° C.) and the jacket temperature is then adjusted, during the ensuing stage of further cooling down to the precipitation temperature in the range from 90° to 113° C. with further distillation of ethanol, in step with the temperature of the solution in such a manner that the jacket temperature at most is 3° C. below the inside temperature and, lastly, during the ensuing stage of precipitation, the solution is kept isothermal by further distillation of ethanol.

Suitable titanium dioxide pigments are those affecting the polyamide crystallization only slightly or not at all, that is, those which evince a slight nucleating effect. The grain size of the pigment is less than 10 microns, preferably less than 2 microns. The pigment grains may be unfinished or also they may be finished to be hydrophilic or hydrophobic.

Advantageously the rutile modification is employed. While in principle the anatase modification is also used, it is however less suitable. The pigments are used in proportions of 1 to 30, preferably 2 to 20% by weight referred to the weight of polyamide.

The process of the present invention succeeds in selectively producing both fluidized bed powders and electrostatic powders. The precipitation powders have high bulk densities depending on their $TiO_2$ contents between 400 grams/liter and 700 grams/liter. In the coating of metals they exhibit excellent properties regarding the running behavior on the substrate, bubble frequency, elasticity and edge coating and, further, with respect to resistance to alkaline aqueous solutions. The fluidized bed powder of the present invention lacks particles in the 0 to 10 microns range and, therefore, no dust arises in the fluidized bed. As a result the need for sifting the powder is entirely superfluous.

The precipitation can also be carried out in the presence of lampblack, $BaSO_4$, ZnS, cadmium red, iron oxide, and such stabilizers as 4-hydroxy-3,5-ditert.-butylphenyl propionic acid, 4-hydroxy-3,5-di-tert.-butylphenyl propionic acid hexamethylenediaminebisamide, propionic acid esters having an aliphatic alcohol with 1 to 18 carbon atoms, tris-alkylphenyl-, tris-alkyl-, tris-aryl-, or mixed esters of phosphoric acid of which the alkyl group contains 1 to 16 carbon atoms and is in the form of a straight or branched chain, or in the presence of surfactants.

SPECIFIC EXAMPLES

The titanium dioxide pigments used in the examples are selected according to the nucleating effect. The values of the nucleating effect are determined by subtracting the maximum inside precipitation temperature of the pigment/polyamide solution ($T_{max\,p}$) by the maximum inside precipitation temperatures of pigment free polyamide solution ($T_o$) as tabulated below:

|  | $T_{max\,p}$ °C. | $T_o$ °C. | $\Delta T$ °C. | Particle Size Microns |
| --- | --- | --- | --- | --- |
| Example 1 | 111.7 | 110.5 | 1.2 | 100% <2 |
| Example 2 | 111.7 | 110.5 | 1.2 | 100% <2 |
| Example 3 | 110.5 | 110.5 | 0 | 100% <2 |
| Example 4 | 113.3 | 110.5 | 2.8 | 100% <2 |
| Comparison Example 1 | 116.9 | 110.5 | 6.4 | 100% <2 |
| Comparison Example 2 | 114.5 | 110.5 | 4.0 | 100% <5 |
| Comparison Example 3 | 115.7 | 110.5 | 5.2 | 100% <2 |
| Comparison Example 4 | 114.1 | 110.2 | 3.9 | 100% <2 |

For determination of the particle size distribution a MICROTRAC-analyser of Leeds & Northrup was used. The analyser is working by diffraction of light and light scattering, the scope of measuring being 0.12–21.2 micron.

EXAMPLE 1

400 kg of polyamide 12 prepared in the presence of 0.5% by weight of phosphoric acid and having an extract content of 0.6% by weight and a relative solution viscosity of 1.60 are suspended together with 2,000 liters of ethanol denatured by means of methylethylketone and with a water content of 1% by weight and with 32 kg of $TiO_2$ pigment ($\Delta T=1.2°$ C.) in 500 liters of ethanol in a 3 $m^3$ reactor (1,600 mm diameter) and are heated to 145° C. Thereupon the jacket temperature is set to 124° C. and the solution is stirred at 50 rpm in a paddle stirrer 800 mm in diameter and is cooled by distilling the ethanol into an external receiver at an average rate of 22° C./hours. At the inside temperature of 125° C., the jacket temperature is controlled in such a manner that it will not be more than 3° C. below the inside temperature.

Precipitation begins when the inside temperature becomes 110° C. and is evident by a rise in the inside temperature. At the beginning of this precipitation stage, the stirrer speed is raised to 70 rpm and the distillation output is raised until the inside temperature remains at 110+/−0.3° C. until the end of the precipitation, which is noticeable by the strong drop of the inside temperature. The precipitation lasts 18 minutes (the total amount of distilled ethanol is 690 liters). Thereupon, distillation is shut off and the corresponding suspension is cooled through the reactor jacket to 45° C. and dried in a paddle drier down to a residual moisture of 0.15% by weight.

The grain size distribution measured by an air jet sieve is as follows:

| Microns | % by weight |
| --- | --- |
| <10 | 0 |
| <40 | 0.4 |
| <63 | 7 |
| <100 | 55 |
| <150 | 95 |
| <200 | 99.9 |

Coarse proportion >200 microns=0.1 percent by weight.

The bulk density of the powder is 550 grams/liter.

Fluidized bed coatings 300 microns thick are made using the portion of the powder less than 200 microns and coating 1 mm sheetmetal previously heated in a circulating air oven to 380° C. The running behavior by the excess powder from the substrate is very good. The surface of the coating is free of irregularities. No dust is produced during the powder fluidization.

EXAMPLE 2

The procedure is the same as in Example 1, however, the cooling rate is set at 12° C./hour. The stirrer speed is kept at 35 rpm to retain the grain size distribution corresponding to Example 1. At 113° C., the time of precipitation was 1 hour and 40 minutes.

EXAMPLE 3

The procedure is the same as in Example 1, however, a hydrophobically finished titanium dioxide pigment is used ($\Delta T=0°$ C.)

EXAMPLE 4

The procedure is analogous to Example 1, but a titanium pigment with a clear nucleating effect is used for the polyamide crystallization ($\Delta T = 2.8°$ C.)

The table below summarizes the test results obtained from the Comparison Examples 1 through 4 and those from the Examples 1 through 4, and their conditions. In Comparison Examples 1 to 4, the titanium dioxide pigments used have nucleating effects of 6.4, 4.0, 5.2 and 3.9, respectively.

TABLE

| | | Input Materials | | Precipitation Procedure | | | | Powder | | Coating Properties | | |
|---|---|---|---|---|---|---|---|---|---|---|---|---|
| | Polyamide Type | TiO$_2$ pigment nucleating effect $\Delta T$ [°C.] | Stirrer [rmp] | Cooling [°C./h] rate | Precipitation Time | Temp. of precipitation [°C.] | | Finest Proportion % by weight | Bulk density [g/l] | Abrasion behavior | Dust | Impact Dent mm/7.6 kg |
| Examples | | | | | | | | | | | | |
| 1 | Polyamide 12 with 0.5% H$_3$PO$_4$ | 1.2 | 50 | 22 | 18 min | 110 | | 0 | 550 | very good | very good | >1,800 |
| 2 | Polyamide 12 with 0.5% H$_3$PO$_4$ | 1.2 | 35 | 12 | 1 hr 40 min | 113 | | 0 | 500 | good | very good | >1,800 |
| 3 | Polyamide 12 with 0.5% H$_3$PO$_4$ | 0 | 50 | 19 | 20 min | 109 | | 0 | 560 | very good | very good | >1,800 |
| 4 | Polyamide 12 with 0.5% H$_3$PO$_4$ | 2.8 | 50 | 22 | 12 min | 111 | | 0 | 520 | good | good | >1,800 |
| Comparison Ex. | | | | | | | | | | | | |
| 1 | Polyamide 12 with 0.5% H$_3$PO$_4$ | 6.4 | 20 | 6 | 10 hr | 116 | | 1.1 | 330 | poor | poor | <500 |
| 2 | Polyamide 12 with 0.5% H$_3$PO$_4$ | 4.0 | 50 | 19 | 8 min | 112 | | 0.6 | 380 | poor | poor | <1,000 |
| 3 | Polyamide 12 with 0.5% H$_3$PO$_4$ | 5.2 | 50 | 20 | 7 min | 113 | | 0.5 | 360 | poor | poor | <1,000 |
| 4 | Polyamide 12 free of H$_3$PO$_4$ | 3.9 | 50 | 19 | 8 min | 112 | | 0.7 | 360 | poor | poor | <1,000 |

What we claim is:

1. In a method for preparing a pulverulent coating composition pigmented with titanium dioxide and based on polyamide having at least ten aliphatically bound carbon atoms per carbonamide group or copolyamide or a mixture of homopolyamide and copolyamide containing at least 70% by weight of said polyamide by precipitation of said polyamide from solution, the improvement comprising adding titanium dioxide pigment having a nucleating effect less than or equal to 3° C. where said nucleating effect is determined by the formula $$\Delta T = (T_{max\,p}) - (T_o)$$

wherein $\Delta T$ is the nucleating effect;

$(T_{max\,p})$ is the maximum precipitation temperature of a solution of polyamide and pigment; and $(T_o)$ is the maximum precipitation temperature of a solution of said polyamide free of said pigment.

2. In the method of producing polyamide powder from polyamide having a relative viscosity of 1.4 to 1.8 as measured in 0.5% metacresol solution at 25° C. and at least 70% of said polyamide consisting of polyamide with at least ten aliphatically bound carbon atoms per carbonamide group, comprising:

(a) dissolving said polyamide in at least twice the amount by weight of ethanol in a closed vessel at a temperature between about 130° to 150° C. to form a solution of said polyamide (b) cooling said solution to a precipitation temperature between about 100° and 125° C.;

(c) precipitating said polyamide powder from said cooled solution of (b) with agitation and under an inert atmosphere; and (d) separating said precipitated polyamide powders of (c) from said ethanol;

the improvement comprising:

(e) rapidly cooling said solution of about 130° to 150° C. to a saturation limit of about 125° C. inside temperature with stirring and distillation of said ethanol under its own pressure;

(f) further cooling said solution below said saturation limit with distillation of said ethanol and cooling with a jacket wherein the jacket temperature is at most 3° C. below said inside temperature up until a precipitation temperature within the range of 90° to 113° C. is reached; and (g) maintaining said solution in the isothermal state during the ensuing precipitation stage by further distillation of ethanol, the further improvement comprising:

(h) adding titanium dioxide pigment after step (a) having a nucleating effect less than or equal to 3° C. where said nucleating effect is determined by the formula $$\Delta T = (T_{max\,p}) - (T_o)$$

wherein
$\Delta T$ is the nucleating effect;
($T_{max\,p}$) is the maximum precipitation temperature of a solution of polyamide and pigment; and
($T_o$) is the maximum precipitation temperature of a solution of said polyamide free of said pigment.

3. The method of claim 2, wherein said pigment is added before step (c).

4. The method of claim 2, wherein said pigment is added after step (c).

5. The method of claim 2, wherein said pigment has a particle size less than 10 microns.

6. The method of claim 5, wherein said pigment has a particle size less than 2 microns.

7. In a method for preparing a pulverulent coating composition pigmented with titanium dioxide and base on polyamide having at least ten aliphatically bound carbon atoms per carbonamide group or copolyamide or a mixture of homopolyamide and copolyamide containing at least 70% by weight of said polyamide by precipitation of said polyamide from solution, the improvement comprising adding titanium dioxide pigment having a nucleating effect less than or equal to 3° C. where said nucleating effect is determined by the formula $$\Delta T = (T_{max\,p}) - (T_o)$$

wherein
$\Delta T$ is the nucleating effect;
($T_{max\,p}$) is the maximum precipitation temperature of polyamide and pigment; and
($T_o$) is the maximum precipitation temperature of a solution of said polyamide free of said pigment, wherein a mixture of 400 grams of said polyamide in granular form and 32 grams of said titanium dioxide are added to 2,400 grams of ethanol and heated to 1450° C. to dissolve said polyamide and form a solution and said soulution is cooled to 110° C. by distillation of said ethanol at a rate of 60° C. per hour.

8. A pigmented pulverulent composition obtained by the process of claim 2 having a grain size between 40 to 250 microns, a bulk density greater than 400 grams/liter and an impact dent test value in excess of 1800 mm/7.6 kg.

9. The pigmented pulverulent composition of claim 7 having a bulk density within the range 500 to 700 grams per liter.

* * * * *